C. F. MERRELL AND E. E. HALL.
CATTLE FLYTRAP.
APPLICATION FILED MAR. 6, 1919.
1,340,071.
Patented May 11, 1920.
2 SHEETS—SHEET 1.
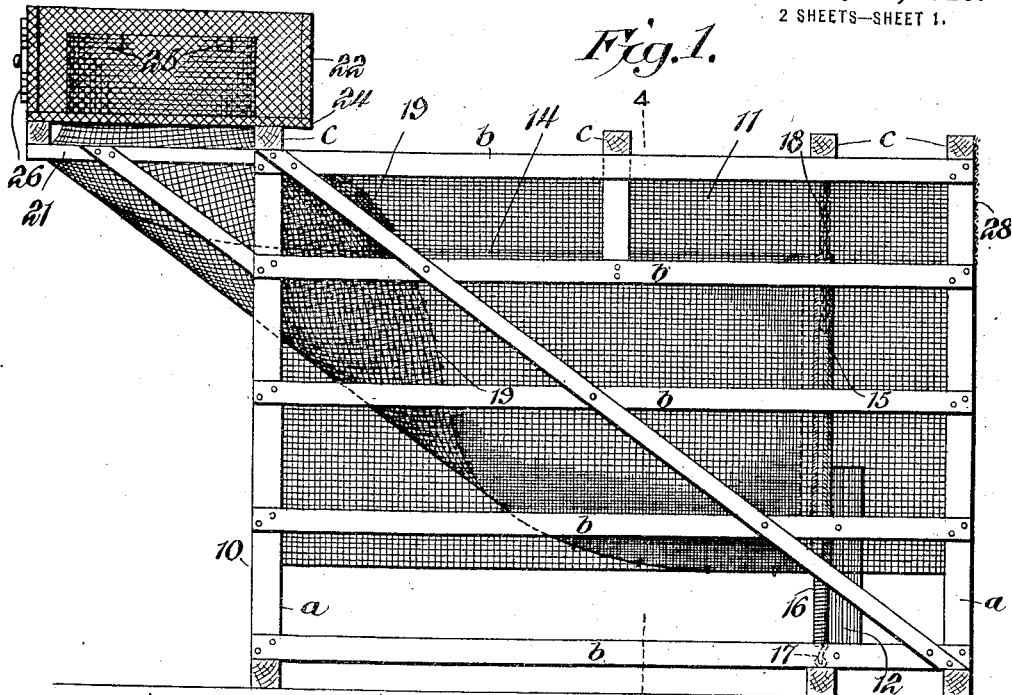
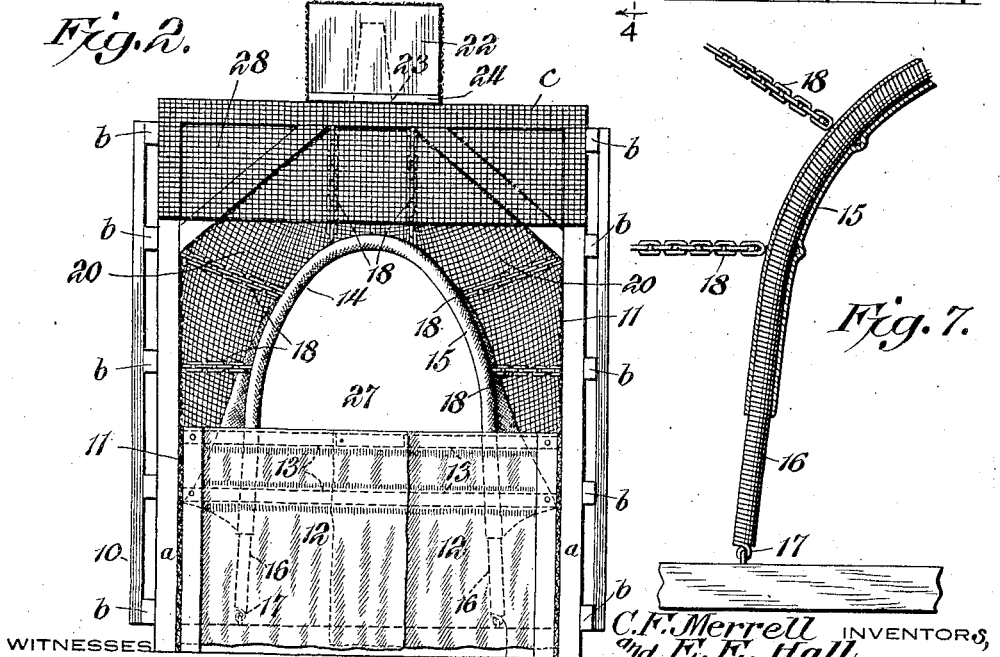

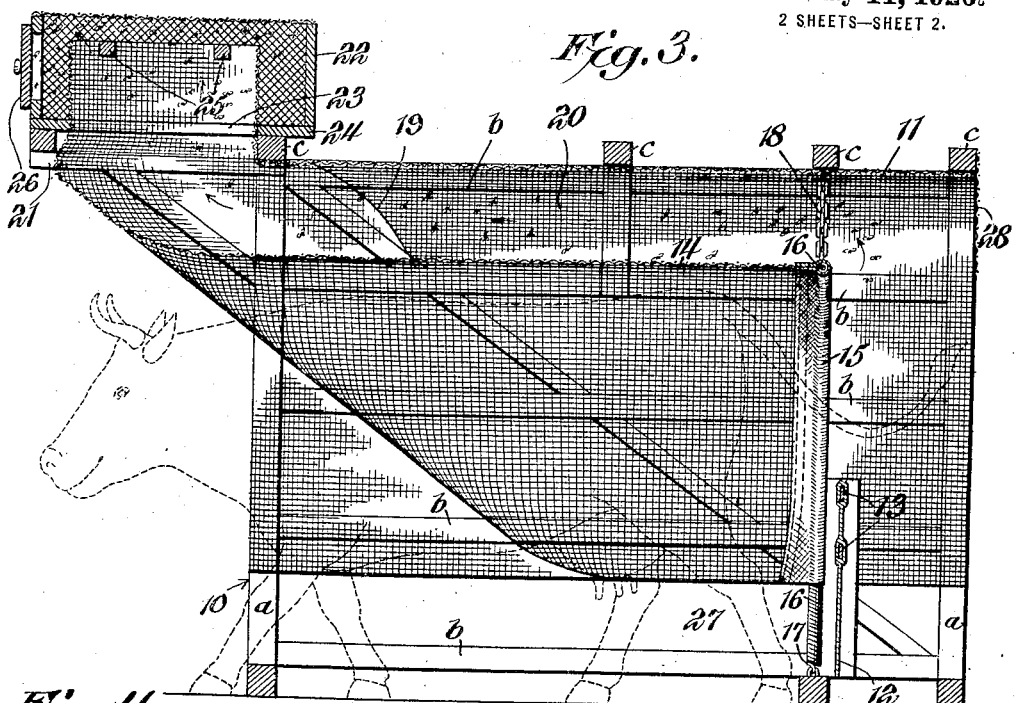
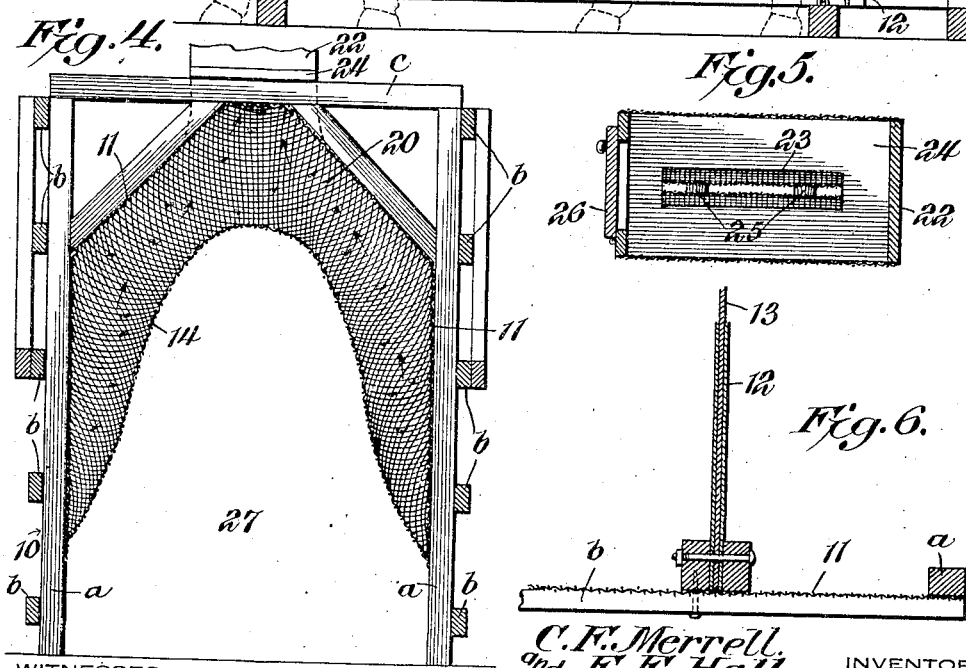
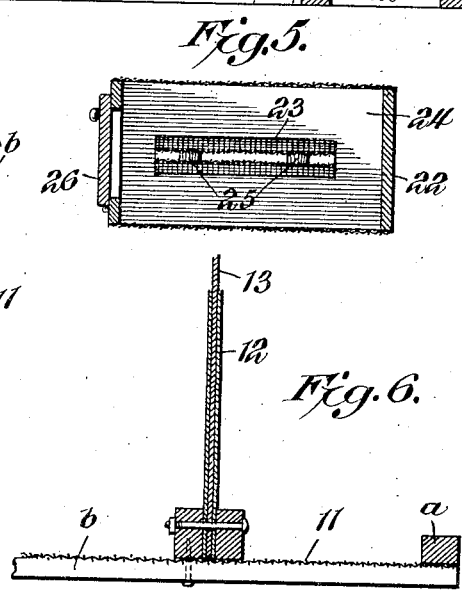

UNITED STATES PATENT OFFICE.

CHARLES F. MERRELL, OF JASPER, MISSOURI, AND EVERETT E. HALL, OF BAYARD, KANSAS.

CATTLE-FLYTRAP.

1,340,071.  Specification of Letters Patent.  Patented May 11, 1920.

Application filed March 6, 1919. Serial No. 281,024.

*To all whom it may concern:*

Be it known that we, CHARLES F. MERRELL and EVERETT E. HALL, citizens of the United States, residing, respectively, at Jasper, in the county of Jasper, State of Missouri, and Bayard, in the county of Allen, State of Kansas, have invented a new and useful Cattle-Flytrap, of which the following is a specification.

The present invention relates to cattle fly traps.

General objects of the invention are to provide a device which is simple in its construction and which is efficacious in removing all the flies from an animal which passes through it.

Those who have watched cattle in the fly season are familiar with their methods of ridding themselves of flies. If any shade is to be found they select the densest places as soon as the sun is well up. They especially prefer heavy underbrush and thickets to stay in so that when tormented by flies they can wipe their sides free of the pests. As long as the sun is high, cattle will stay in the underbrush, from time to time rubbing against bushes and walking under low hanging boughs. Only at sunset when driven by hunger do they relinquish the shade.

Farmers incur heavy losses because of flies. The cattle are pestered so much that they do not fatten, but barely hold their own and even lose weight during fly time. The cows cease to give much milk. As every pound of beef and butter fat is valuable, both to the cattle owner and to the nation, and as there are millions of cattle more or less troubled with flies, it is obvious that the loss in beef and milk from the fly pest in the aggregate is enormous.

Now while bushes are very effective in ridding cattle from flies, there is nothing to prevent the dislodged insects from either settling down in the bushes to await the next victim, or from overtaking the temporarily freed animal and alighting in their former places. This is just what happens. Thickets, however dense, offer no solution of the cattle fly problem. Moreover, in large areas of the country where cattle are raised, trees and underbrush are unknown. There is a real need, then, of a reasonably inexpensive and simple device which will rid cattle of flies and entrap the flies.

A particular object of this invention is to provide a cattle fly trap which utilizes the well known propensity of the animal to rub its body against anything near at hand, when bitten by flies.

For a complete understanding of the invention reference is made to the drawings which accompany this specification and which illustrate the preferred form of the invention.

In the drawings:—

Figure 1 is a side elevation of a cattle fly trap constructed in accordance with the invention;

Fig. 2 is an elevation of the entrance end of the trap;

Fig. 3 is a vertical longitudinal cross-section of the trap with an animal in the act of passing therethrough indicated in dotted lines;

Fig. 4 is a cross sectional view on the line 4—4 of Fig. 1 and looking in the indicated direction.

Fig. 5 is a horizontal longitudinal section of the fly receiving cage;

Fig. 6 is a fragmentary horizontal view showing a leg-wiping curtain and its connection to the frame; and Fig. 7 is a fragmentary view showing the suspension means and its connection with the wiping netting at the entrance of the trap.

The numeral 10 designates the frame of the fly trap, being open at the ends to provide an entrance and an exit. This frame is made up of vertical posts $a$, connected by side rails $b$ and top rails $c$, and braced as shown. The construction of this frame may be varied at will, and need not be described in detail. The two sides and top of the frame support an outer wire netting or section 11, which is arranged on the inside of the frame. As shown in Figs. 1 and 3 the netting 11 need not extend to the bottom of each side but may be spaced a foot or so above the ground. As the netting 11 is secured on the inside of the frame it assumes an arch shape as shown in Fig. 4. Near the entrance, but set within or forward of the trap structure is a pair of horizontal, leg-wiping elements 12, each consisting of a curtain reinforced by a plurality of flat springs 13. These springs are inclosed by the curtains so that they will not chafe the legs of the animals. Instead of flat springs other resilient or elastic means may be used to hold the leg-engaging curtains normally in the path of the cattle and at about the height of the legs of the animal. The curtains are secured to the frame in such a way as to normally overlap each other and lie at right angles to the frame sides. Fig. 6 shows one method of securing the curtains to the frame.

The outer netting 11 or inclosing member surrounds and partially supports an inner netting or rubbing member 14. At the entrance end the inner netting has an arcuate shape and is provided with a margin 15 of some textile material. The textile margin provides a flexible casing for a coil spring 16, whose ends 17 are secured to the bottom of the frame. Chains 18 or similar flexible elements are provided to maintain the margined netting at the entrance end in its arched shape, thereby providing a freely expansible entrance. These chains, it is clear, support the inner netting or member flexibly and movably within the trap body, and in spaced relation to the outer netting.

The marginal edges 19 of the inner netting, except at the entrance end, are secured to the frame 10 and to the outer netting, so as to form a trapping chamber 20 therewith. The inner netting follows the general contour of the outer netting as shown in Figs. 3 and 4, being spaced therefrom at the sides and top. The inner netting terminates short of the outer netting at the entrance end and extends beyond the outer netting at the exit end. Near the exit end the inner netting is turned over and bent upwardly and is fastened along its rear edges to an outrigger frame 21. It is thus seen that the inner netting is secured only along its edges and is unsecured elsewhere. This method of supporting the netting allows the latter to give in all directions when subjected to a strain. The outrigger frame 21 supports a fly receiving cage 22. The edges of the inner netting are spaced apart beneath the cage 22 and run up through a slot 23 in the bottom 24 of the cage. These spaced apart edges provide a non-return entrance into the cage. Spacing blocks 25 or like devices are provided to maintain the edges at the proper distance from each other. A door 26 closes one end of the cage and allows cleaning out the accumulated dead flies at intervals.

The leg-wiping curtains 12 are placed across the bottom of the entrance end of the inner netting so that the animal strikes them just after it enters the trap. They come close to the ground and when pressed upon, bend inwardly into the central aisle or passage 27 formed by said netting. Stretching across the upper part of the entrance is a strip 28 of netting provided for a purpose to be described.

The inner netting is so held by the chains and by its attachment to the outer netting and to the frame that the passage 27 is about as high and as wide as the body of the average cow. As shown in Fig. 4 it is shaped in cross section to fit the back and sides of a cow. This inner netting is to provide the animal with a yieldable body wiping means and preferably is of stout material so as to withstand the brisk rubbing of the animals without wearing out. The outer netting need not be as strong, but both nettings are to have a mesh sufficiently fine to prohibit the passage of the small cattle fly therethrough.

The operation of the trap is more or less obvious from Fig. 3. The animal first encounters the leg wiping curtains 12 which brush the flies off each leg. Then its shoulders rub against the cloth covered expansible margin 15 at the entrance of the inner netting which, because of the contractive tendency of the coil spring, bears firmly against the neck and shoulders and wipes them free of flies. As the rest of its body reaches the margin it expands to adjust itself to the irregularities of the contour of the animal and rids the animal of nearly all the flies. The few which persist in clinging to her will be removed during the movement of the animal through the passage 27, during which it rubs either or both sides against the netting as though it were going through underbrush.

The flies driven off the legs rise by instinct, and finding the outer netting above them, soon settle upon it. The momentum of the cow, owing to the fact that usually the animals go through the trap on the run, is such that most of the flies while they rise, keep going in the same direction they have been going. This carries the flies well into the space or chamber 20. The strip 28 deters the few flies which settle on the outer netting from going out through the entrance, Cattle flies travel in swarms, and where a few go, the rest will follow. The flies disturbed by the leg wipers act as leaders or decoys for those wiped off by the cloth margined edge of the inner netting. The flies not removed by said edge are brushed off in the passageway 27 temporarily filled by the animal's body, and these seeing the others, follow them up into the chamber 20. Once in this chamber the flies tend to keep rising and swarm by stages into the receiving cage 22. Usually such a trap as the present one is provided for a large number of animals and these follow each other through the structure, each in its passage shaking and pushing in the inner netting. Inevitably under these conditions the flies do not settle upon the nettings, but fly as high as they can until they reach the cage 22, when they are permanently trapped.

The margined entrance of the inner netting is preferably set about two feet inside the structure. Were it much closer to the entrance the brushed off flies would be likely to escape through the latter. The manner in which the inner netting is suspended insures its being highly responsive to any force exerted upon it. Hence there is no danger of its breaking or bending out of shape when animals rub against it.

Certain features of the present invention which are not covered in the claims will be found to be protected by a copending application Serial No. 232,847, filed May 6, 1918.

We do not wish to be limited to the use of netting for both the outer and inner sections or members 11 and 14, as finely perforated metal could be used for the outer section or member, while the inner section or member could be made of leather or cloth.

Many changes in details might be resorted to in practice without departing from the spirit of the invention.

What we claim is:—

1. In a cattle fly trap, a frame, an outer netting held upon the frame, an inner netting supported within the frame, and spaced from the outer netting, said inner netting constituting fly wiping means, and means for trapping the disturbed flies.

2. In a cattle fly trap, the combination with a frame, an outer netting supported by the frame and having an arched shape in cross section, an inner netting also supported by the frame and arranged within the outer netting and spaced therefrom, said inner netting also being arched in cross section and forming a central passage, the space between the inner and outer nettings forming a passage for flies, which passage is open at the entrance end of the trap, and a fly trapping means at the exit end communicating with said space.

3. In a cattle fly trap, a frame, an outer reticulated member attached to the frame, an inner reticulated member supported within the frame, said inner member being shaped to embrace the body of an animal and yet permit free passage therethrough, thereby providing fly wiping means and cooperating with the outer member to form an entrapping chamber, and means communicating with said chamber for catching the flies.

4. In a cattle fly trap, a frame, an outer netting attached to the frame, an inner netting supported within the frame and shaped to provide a passageway for animals, said inner netting being held along its edges to the frame and to the outer netting and spaced from the outer netting, and means connected to the frame and to the inner netting to maintain said netting as a passageway.

5. In a cattle fly trap, a frame, an outer netting held upon the frame, an inner netting held within the frame, said inner netting providing rubbing means for the animals and in coöperation with the outer netting an entrapping chamber for the flies, said inner netting further providing a passageway for the animals, and a fly receiving cage connected to the frame and opening into said chamber.

6. In a cattle fly trap, a frame, an outer netting rigidly secured to the frame, an inner netting held within the frame in spaced relation to the outer netting to form an entrapping chamber for the flies, said inner netting providing rubbing means as well as a passageway for animals, the entrance end of the inner netting being disposed to the rear of the outer netting and the frame, and having flexible supporting means.

7. In a cattle fly trap, a frame, an outer netting rigidly secured to the frame, an inner netting held within the frame in spaced relation to the outer netting, said inner netting providing a rubbing means and passageway for the animals and together with the outer netting an entrapping chamber for the flies, and flexible means secured to the frame and to the entrance end of the inner netting for supporting said netting the desired distance from the outer netting.

8. In a cattle fly trap, a frame, an outer netting secured to the frame, an inner netting spaced from the frame, and flexible supporting means for maintaining said inner netting substantially in an arched condition to allow passage of animals, and resilient means tensioning said supporting means.

9. In a cattle fly trap, a frame, an outer netting secured to the frame, an inner netting spaced from the frame, and flexible supporting means for maintaining said inner netting substantially in an arched condition to allow passage of animals.

10. In a cattle fly trap, a frame, an outer netting secured to the frame, an inner netting providing a passageway for animals, said inner netting also providing rubbing means for the animals, and in coöperation with the outer netting forming an entrapping chamber, and a fly receiving cage upon the frame, the inner netting being shaped to provide a guiding passageway for the entrapped flies leading from the entrapping chamber into said cage.

11. In a cattle fly trap, a frame, having an entrance and an exit end, an outer netting secured to the frame, an inner netting movably mounted within the frame and spaced from the outer netting and providing a passageway for animals, flexible elements secured to the frame and holding open the entrance end of the inner netting, and a coiled spring secured at each end to the bottom of the frame and intermediate of its ends to the entrance end of said inner netting.

12. In a cattle fly trap, a frame, an outer netting secured to the frame, an inner netting in the frame and held spaced from the outer netting, said inner netting providing a passageway for animals, a plurality of flexible elements secured to the frame and holding open the entrance end of the inner netting, a flexible margin attached to said entrance end, and a coiled spring inclosed intermediate its ends by said margin and secured to the frame at its ends.

13. In a cattle fly trap, a frame, an outer netting secured to the frame, an inner netting held spaced from the frame walls, said inner netting providing a passageway for animals, the entrance end of said inner netting being spaced from the entrance end of the frame, and leg wiping means normally closing the lower part of the entrance to said passageway.

14. In a cattle fly trap, a supporting structure having an entrance and an exit, an outer netting covering the sides of said structure, an inner netting providing a passageway and supported within the outer netting and spaced therefrom and from the entrance, leg wiping means extending across the lower part of the entrance end of the inner netting, said leg wiping means comprising two flexible curtains overlapping each other, and means for returning said curtains to the overlapping position after displacement.

15. In a cattle fly trap, a frame provided with an outer netting, an inner netting suspended within the frame and providing a passage therethrough, and means coöperating with said inner netting for removing flies from animals, said means comprising two curtains each secured to the frame at one end and extending across the passage in an overlapping relation, and resilient means normally holding said curtains in their extended position.

16. In a cattle fly trap, a frame with an outer netting, an entrance and an exit and a passage therethrough, means for removing flies from the legs of animals, said means consisting of two flexible curtains each secured to either side of the frame and extending across said passage entrance, and resilient means for normally holding said curtains in their extended position.

17. A cattle fly trap comprising fly entrapping means, body wiping means and leg wiping means, said leg wiping means including flexible curtains secured on opposite sides directly in the path of the animal, at the entrance to the trap, and springs inclosed by said curtains and normally maintaining them in obstructing position.

18. In a cattle fly trap, leg wiping means provided at the entrance to the trap and consisting of horizontally movable spring-actuated curtains in overlapping relation to each other.

19. A cattle fly trap having a passageway, the top and side walls of which constitute flexible wiping means to wipe flies from the body of an animal passing therethrough and said walls being made of foraminous material.

20. A cattle fly trap having a passageway, the top and side walls of which constitute flexible wiping means to wipe flies from the body of an animal passing therethrough and said walls being made of foraminous material, the entrance to said passageway being arch shaped and made flexible and provided with leg wiping means.

In testimony that we claim the foregoing as our own, we have hereto affixed our signatures.

CHARLES F. MERRELL.
EVERETT E. HALL.